Figure 1:
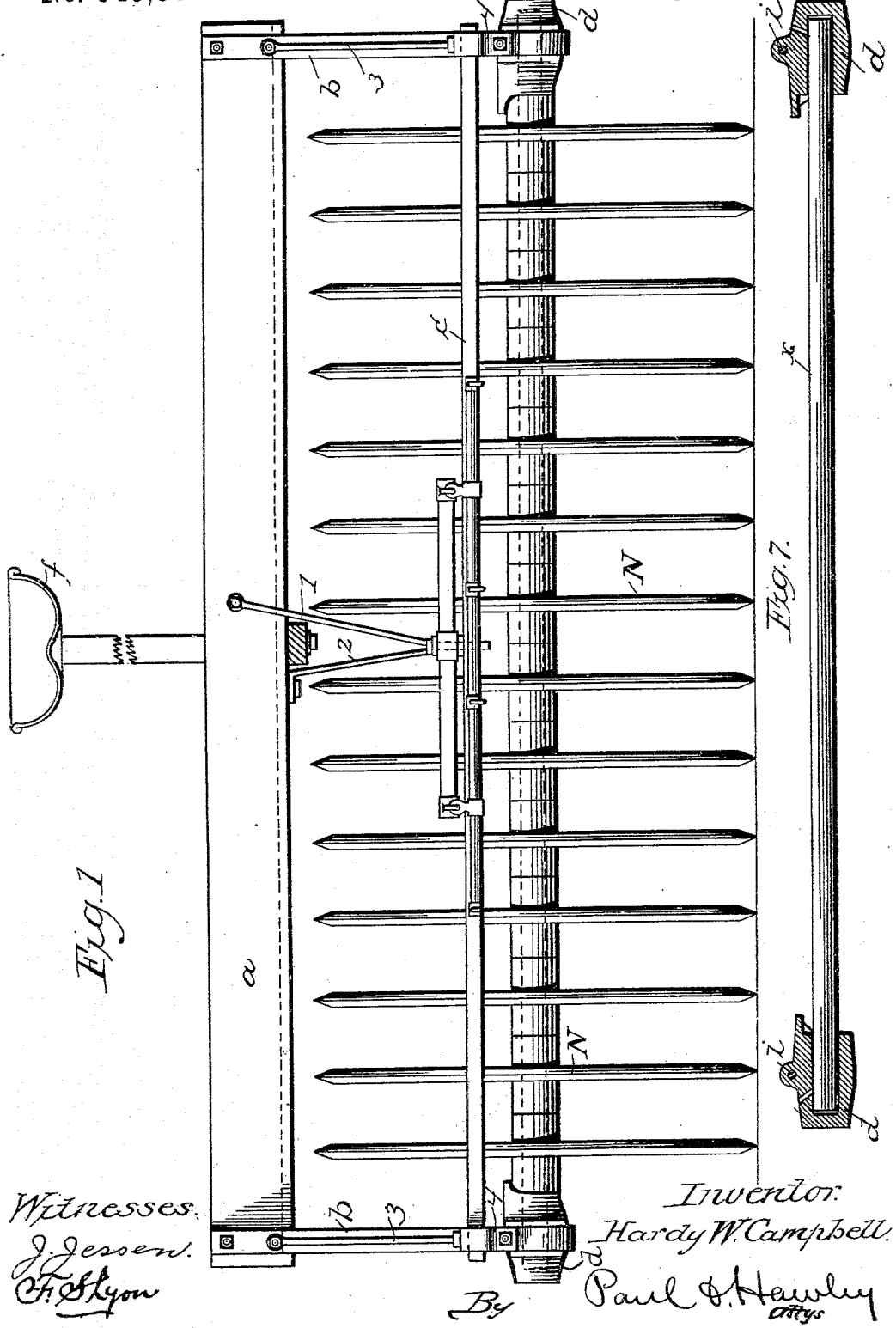

(No Model.) 2 Sheets—Sheet 2.
H. W. CAMPBELL.
SUBSURFACE PACKER.
No. 545,342. Patented Aug. 27, 1895.
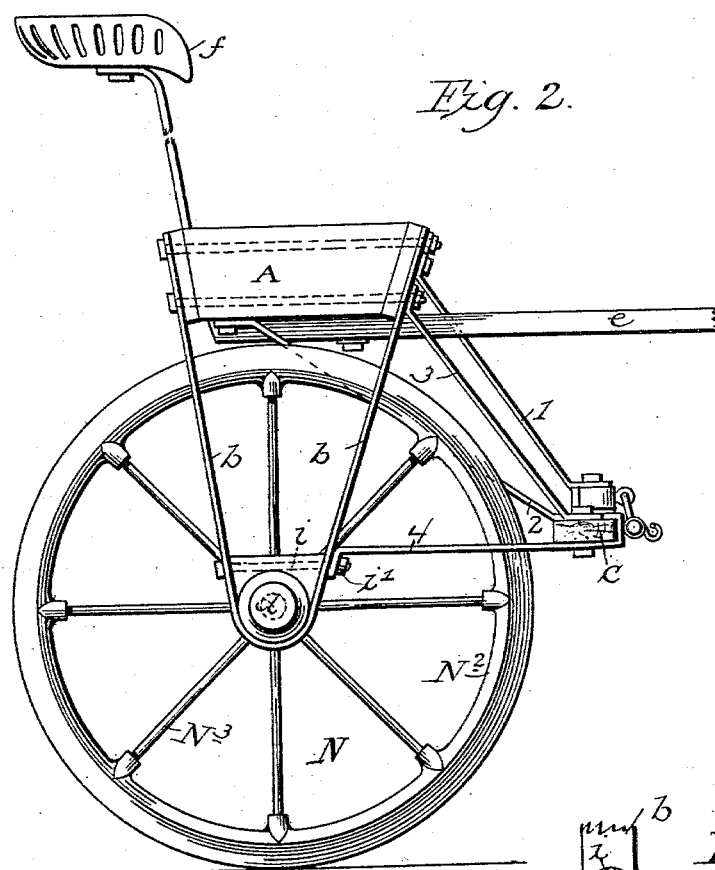
Fig. 2.
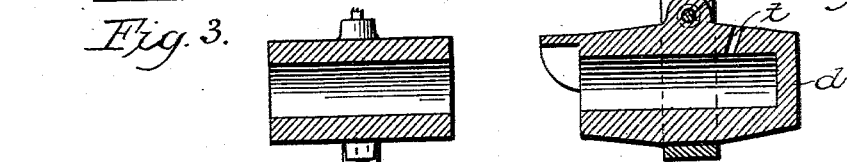
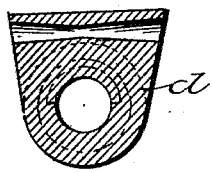
Fig. 4
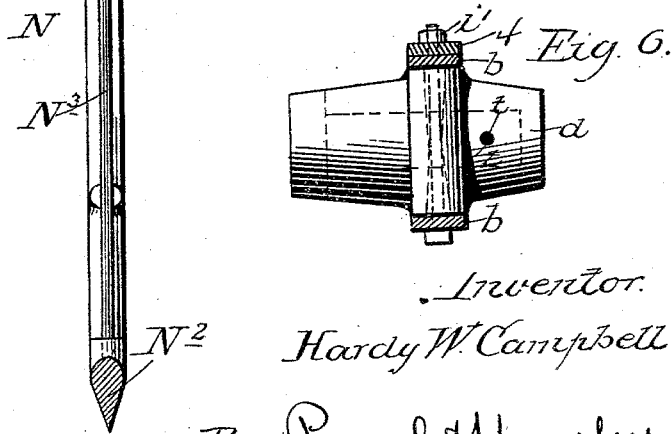
Witnesses.
J. Jensen
F. S. Lyon
Inventor.
Hardy W. Campbell.
By Paul H. Hawley
attys

UNITED STATES PATENT OFFICE.

HARDY W. CAMPBELL, OF PUTNEY, SOUTH DAKOTA.

SUBSURFACE-PACKER.

SPECIFICATION forming part of Letters Patent No. 545,342, dated August 27, 1895.

Application filed April 3, 1894. Serial No. 506,150. (No model.)

*To all whom it may concern:*

Be it known that I, HARDY W. CAMPBELL, of Putney, Brown county, State of South Dakota, have invented certain new and useful Improvements in Subsurface-Packers, of which the following is a specification.

This invention relates to a device designed for packing the soil beneath the surface after it has been plowed for the purpose of putting it in proper condition to absorb and retain moisture during the dry season, and also at the same operation to so loosen the soil upon the surface that it will form a mulch to prevent the evaporation of the moisture contained in the soil or seed-bed beneath the surface.

It is a well-known fact that in the arid sections of the country there has been a constant decrease in the average yield of grain, and this has generally been supposed to have been due to a decreased fertility in the soil and to the fact that the rainfall has either not been sufficient or the rains have been at such rare intervals that the soil would be thoroughly dried out and the crop ruined during the dry time intervening. I have found that soil of this character, if put in proper condition, will produce a greater yield even after it has been cultivated for years than it would when it was first cultivated, while land immediately adjacent thereto, when prepared for the crop in the usual manner, produces so small a quantity of grain as in many instances not to pay the cost of growing. I find that in order to prepare a piece of land for the sowing of seeds in these arid sections it is desirable to plow the soil to a depth of from six to eight inches. It has been fully and thoroughly demonstrated that newly-plowed and thoroughly-packed soil will absorb and retain a much greater amount of moisture than when in its natural condition, and the more firmly packed and pulverized the particles of earth are the greater the power of capillary attraction, and it has been found that when in such a condition the moisture is drawn from three to four feet below the surface. It happens, however, that in ordinary plowing, in turning over the furrow, there will be one or more tiers or rows of air-cavities at the bottoms of the furrows, caused by the fact that in all plowing the soil which is turned up by the moldboard breaks at the center and the inner and outer parts strike the bottom of the preceding furrow, and by the further fact that the loose clods and lumps of earth and the stubble and other vegetable matter lying on the top of the ground fall to the bottoms of the furrows and are thus covered by the soil that is turned over by the plow. In connection with these facts is the further fact that in the arid sections the soil does not weigh more than one-half as much per cubic foot as it does in the other or humid districts, and owing to this lightness it does not settle or pack down, as it otherwise would, one reason for this lightness of the soil being that it contains a large amount of vegetable matter, which, because of the dry condition, does not readily decompose. These air-cavities at the bottoms of the furrows are of such size that it is impossible for the moisture to be carried across them by capillary attraction, and hence they form a stock or dam, as it were, to prevent the moisture in the subsoil beneath from passing upward by capillary attraction to feed the root of the plant in the seed-bed above. Again, these air-cavities act as a drain to carry off the water from the soil above, hence causing the soil to dry up quickly at the top and preventing decomposition of the straw, stubble, or other vegetable matter that has been turned under in the process of plowing.

I am aware that land-rollers have been made for rolling and packing the soil after plowing, but they pack the surface more than the soil beneath, and I find that in order to derive the benefits from packing and pulverizing the subsoil after plowing some means must be provided for preventing the rapid evaporation of the moisture contained in the seed-bed or subsurface, which will quickly pass up to the surface through the pores of the soil, and thus evaporation sets in immediately after the soil is packed. To this end I provide a machine designed to be used after plowing to thoroughly pack and pulverize the soil beneath the surface, to crush the lumps of earth, break in the cavities that may be formed beneath the furrows, and cut up the vegetable matter and weeds that may be contained in the subsurface, and pack the soil firmly onto them, and at the same time to so loosen and break up the soil on the surface to the depth of several inches as to leave it lumpy and broken behind the machine, and thereby prevent the evaporation of the moisture contained and gathered in the soil beneath. For this purpose I provide a machine having a series of loose wheels all mounted at intervals upon a rigid axle, whereby no one of the wheels can be raised without raising a considerable portion of the entire weight of the machine. I also provide each wheel with a rim having a cutting-edge, whereby as the packer is drawn over the ground the sharp edges of the rims are forced into the soil, and cutting through any straw or similar material or through any clods or lumps of soil reach the bottom of the furrows and completely pack the subsoil, thereby doing away with all cavities and any looseness of soil at the bottom of the furrows, and as the edges of the wheels cut down into the soil as they rotate the earth will be pressed between the wedge faces of adjacent wheels, and as the wheel turns this earth will be raised a slight distance above the surface, and then falling back behind the wheel of the machine will form a loose lumpy covering several inches thick for the packed subsurface and act as a mulch to retain the moisture of the seed-bed. I have demonstrated the great value of this process of preparing soil by plowing two adjacent fields to the same depth (about eight inches) and going over both fields with my subsurface-packer, and then going over one with an ordinary land-roller, which leaves the surface of the ground hard. Some time after the soil was treated I examined the field upon which I had used only the subsurface-packer and found a very liberal amount of moisture in the soil beneath the loose covering, while the soil of the field where the land-roller was used was dry to the depth of two feet. Shortly after I made this examination several inches of rain fell, and in eight days from the time the rain fell the soil packed by the land-roller was thoroughly dry, while the soil of the other field twenty days after the rainfall was still moist, thus proving conclusively the value of the process and the great advantage to be derived from the use of this machine.

I find by experience that in the arid sections of the country the important conditions of the soil are to have it newly plowed, thoroughly packed, and pulverized to the bottom of the plowing, with the exception of the loose upper surface; and I have found by actual experience a gain of over one hundred per cent. in one field and of over two hundred per cent. in another where the soil was packed in this manner and the surface was broken up and loosened by the process described.

My invention consists, generally, in a machine to fit the bottom of deep plowing, so as to force decomposition of the vegetable matter in the soil and to produce perfect capillary attraction throughout the seed-bed, and at the same time the machine is packing the subsurface to leave behind it a loose broken upper surface, which will prevent evaporation of the moisture below; and the invention may be termed a "subsurface-packer," with a series of wheels mounted loosely upon a rigid axle, with a space between each wheel, and each wheel having a rim with a cutting or wedge-shaped face.

My invention further consists in the constructions and combinations hereinafter described, and particularly pointed out in the claim; and the invention will be more readily understood by reference to the accompanying drawings, forming part of this specification, in which—

Figure 1 is a front end elevation of a machine embodying my invention. Fig. 2 is a side elevation of the same. Fig. 3 is a detail of a portion of the wheel. Figs. 4, 5, and 6 are details of the boxes. Fig. 7 is a detail of the axle and boxes.

In the drawings, $a$ represents a suitable frame, which is preferably made in the form of a box, adapted to hold weights for the purpose of weighting down the machine. It is also adapted to support a suitable seat $f$, upon which the driver may be seated while using the machine. The frame or weight-box $a$ is supported by suitable standards $b$, which are secured to said box at their upper end, and at their lower ends preferably extend around and are secured to a bearing-box $d$. The bearing-box $d$ is preferably open only at its inner end and receives the end of the axle or shaft $x$. Each box $d$ is preferably formed with inclined sides and with a curved under side, and the standards $b$ extend around the box and are secured thereto by means of a bolt $l$, that extends through an opening in the upper portion of the box and is secured in place by a nut $l'$. By this means the standards and the box at each end are securely fastened together, while at the same time the standards may be readily removed from the box when desired. The shaft or axle $x$ has a bearing at each end in one of the boxes $d$, and said box is provided with a suitable oil-opening $t$, to which oil may be supplied to the bearing. By having the box closed at its outer end sand and dust are prevented from working into the end of the box. By having the bolt $l$ arranged at or near the top of the box the weight is brought upon the bolt $l$ and the box $d$ is allowed a slight movement to permit it to fit itself to the shaft $x$. As the box $d$ is closed at its outer end and the oil is supplied near this closed end of the box and works through the box and out at its open end around the axle, any dust and dirt that get into the box naturally work out at the open end with the oil. The standards $b$ are preferably connected to the boxes $d$ so as to permit a slight oscillating movement to the boxes to permit them to accommodate themselves to the axles at all times, thereby preventing the axle from binding in the boxes.

This is accomplished by making the ends of the hole through which the bolt 2 passes slightly larger than the bolt at both ends and by passing the standard around the under side of the box without fitting very closely against the same, thereby permitting the box to have a slight movement both in the direction of its length and at right angles thereto.

Mounted upon the axle $x$ are the series of packing-wheels N. Each of said wheels is provided with a suitable hub N', rim $N^2$, and spokes $N^3$. The outer edge of the rim is made in the form of a cutter or wedge, as shown in detail in Fig. 3. The hubs are of sufficient length to suitably space the wheels, or, if it is desired to have them farther apart than they will be brought by the length of the hubs, suitable collars may be placed upon the shaft or axle between said hubs.

$e$ represents the pole, which is secured preferably to the frame or weight-box $a$, and $c$ represents the cross-bar to which the eveners or doubletrees may be attached. The cross-bar $c$ is preferably secured by means of the braces 1, 2, 3, and 4, extending from said cross-bar to the weight-box or frame $a$ and the lower portions of the standards $b$. These braces will be sufficient to secure the cross-bar $c$ in position to enable it to receive the draft applied thereto by means of the trees and evener. By placing additional weights upon the frame or weight-box $a$ the machine may be loaded with any desired amount, thus permitting it to be used upon any kind of soil. The wedge-faced wheels hung or mounted freely at intervals upon one continuous shaft provide means for packing firmly the extreme bottom of deep plowing, and also for leaving the surface behind the machine loose and broken, which is a vital point to be obtained in a construction of this kind. Under no other conditions can the soil give the proper amount of plant food and retain its moisture, and any looseness in the soil or small cavities in the bottom of the furrows cuts off the supply of moisture by preventing capillary attraction and acts as a drain to the natural rainfall, and also acts in a sense to preserve any vegetable matter which may have been turned under in the plowing. The wedge-faced wheels cut through any straw stubble which may be upon or in the soil, and as the line of pressure is at right angles with the bevel of the face both a side and down pressure is obtained, so that when the wheels are forced down five inches or over into the soil the soil is firmly packed clear across the bottom between the edges of the wheels, while the soil on the surface between the wheels is left loose and broken.

To secure perfect packing in the bottom of the plowing the distance apart of the wheels must be governed by the depth of the plowing. The greater the depth of the plowing the greater should be the distance between the wheels, and this object can be accomplished by placing collars or rings between the hubs, and thus separating the wheels more or less, as may be required. The importance of having all of the wheels mounted upon a single rigid shaft is very perceptible when the condition of the soil at the bottom of the plowing is understood, and especially is this true with the wedge-faced wheels. In the bottom of the very best plowing may be found two tiers or lines of cavities with the soil between them more or less firm, and those firm parts rise generally above the level of the surface of the soil. To perfectly pack the bottom of the plowing, these wheels must all be forced on a line down through the firm parts, in order to crowd the soil into all of the cavities. It is also very essential that the wheels should be arranged on the shaft with a space between each wheel. Otherwise the surface would be packed, which process would greatly assist the evaporation from the subsoil.

Another point of advantage in favor of the wedge-faced wheels is the frequent contact of the wheels with sods or clods. If a flat face were used upon the wheels, it would be forced to rise over said sods or clods, while the wedge-faced edge cuts through and leaves no unpacked points or parts in the bottom of the plowing under said sods or clods. As all of the wheels are upon one shaft, they are necessarily all of them forced through the soil to the bottom of the furrow.

By use of this subsurface-packer the bottoms of the furrows of the newly-plowed ground are put in proper condition to force decomposition of all foreign matter turned under and produce perfect and equal capillary attraction in the entire field, and at the same time a loose broken covering or mulch is formed on the surface, preventing evaporation, and thus producing a perfect moisture-reservoir and root-bed for the crop when sown.

The details of my machine may be varied without departing from my invention.

Having thus described my invention, I claim as new and desire to secure by Letters Patent—

The combination, with a single continuous shaft, of a series of wedge-faced wheels mounted upon said shaft, a space being provided between every two wheels extending from the hubs thereof to the peripheries and said wedge-faced wheels constituting the only bearings for said machine upon the surface of the ground, whereby the wheels are permitted to sink to the bottom of the furrows and pack the sub-soil, fixed boxes forming bearings for said shafts, standards secured upon said boxes, and a suitable frame mounted upon said standards, substantially as described.

In testimony whereof I have hereunto set my hand this 24th day of March, A. D. 1894.

HARDY W. CAMPBELL.

In presence of—
A. C. PAUL,
M. E. GOOLEY.